(12) United States Patent
Nguyen et al.

(10) Patent No.: US 10,884,481 B2
(45) Date of Patent: Jan. 5, 2021

(54) APPARATUS AND METHOD FOR IMPROVING POWER SAVINGS BY ACCELERATING DEVICE SUSPEND AND RESUME OPERATIONS

(71) Applicant: KONICA MINOLTA LABORATORY U.S.A., INC., San Mateo, CA (US)

(72) Inventors: Thien Nguyen, San Jose, CA (US); Shaun Pinney, Newark, CA (US); Hiroyasu Ito, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 260 days.

(21) Appl. No.: 15/942,170

(22) Filed: Mar. 30, 2018

(65) Prior Publication Data
US 2019/0302875 A1    Oct. 3, 2019

(51) Int. Cl.
  *G06F 1/32*        (2019.01)
  *G06F 1/3287*      (2019.01)
  *G06F 12/0875*     (2016.01)
  *G06F 12/0866*     (2016.01)

(52) U.S. Cl.
  CPC ........ *G06F 1/3287* (2013.01); *G06F 12/0866* (2013.01); *G06F 12/0875* (2013.01); *G06F 2212/1028* (2013.01); *G06F 2212/451* (2013.01); *G06F 2212/452* (2013.01)

(58) Field of Classification Search
  CPC ...................................... G06F 1/32; G06F 9/44
  See application file for complete search history.

(56) References Cited

U.S. PATENT DOCUMENTS

| | | | |
|---|---|---|---|
| 6,968,469 | B1 | 11/2005 | Fleischmann et al. |
| 2002/0095536 | A1* | 7/2002 | Emberty ............ G11B 20/1217 710/65 |
| 2004/0004917 | A1 | 1/2004 | Lee |

(Continued)

FOREIGN PATENT DOCUMENTS

| | | |
|---|---|---|
| JP | 3-271854 A | 12/1991 |
| JP | 8-76872 A | 3/1996 |

(Continued)

*Primary Examiner* — Keshab R Pandey
(74) *Attorney, Agent, or Firm* — Buchanan Ingersoll & Rooney PC

(57) ABSTRACT

An apparatus and method are disclosed for improving power savings by accelerating suspend and resume operations. The apparatus having a main integrated circuit, the integrated circuit having a context area, a context snooper, and a context cache, the context area configured to store context change information, the context snooper configured to monitor the context change information, and the context cache configured to store at least a portion of the context change information being monitored by the context snooper; and a memory, the memory configured to receive the at least a portion of the context change information from the context cache upon a suspend process signal to the main integrated circuit, to retain contents during the main integrated circuit suspend, and restore the at least a portion of the context change information to the context cache and/or the context area upon a resume process signal to the main integrated circuit.

20 Claims, 14 Drawing Sheets

(56) References Cited

U.S. PATENT DOCUMENTS

| | | | |
|---|---|---|---|
| 2006/0031565 A1* | 2/2006 | Iyer | H04L 49/90 709/234 |
| 2011/0314221 A1* | 12/2011 | Kawada | G06F 11/1456 711/114 |
| 2012/0047516 A1* | 2/2012 | Barwick | G06F 9/461 718/108 |
| 2012/0084258 A1* | 4/2012 | Karonde | G06F 11/1461 707/641 |
| 2013/0308148 A1* | 11/2013 | Hara | H04N 1/00896 358/1.13 |
| 2014/0006722 A1* | 1/2014 | Horikawa | G06F 12/0808 711/145 |
| 2018/0074566 A1* | 3/2018 | Fukada | G06F 1/3225 |
| 2019/0238653 A1* | 8/2019 | Syomichev | H04L 67/1004 |

FOREIGN PATENT DOCUMENTS

| | | |
|---|---|---|
| TW | 200403557 A | 3/2004 |
| WO | WO 99/14671 A1 | 3/1999 |

\* cited by examiner

APPARATUS AND METHOD FOR IMPROVING POWER SAVINGS BY ACCELERATING DEVICE SUSPEND AND RESUME OPERATIONS

FIELD OF THE INVENTION

The present disclosure generally relates to a system and method for improving power savings by accelerating device suspend and resume operation for devices and systems, especially, having two or more central processing units (CPUs), for example, the two or more central processing units including a main CPU and a low power CPU by monitoring context change with a context snooper and saving/restoring context changes to/from a memory or storage device, for example, a non-volatile memory. In addition, the system and method as disclosed can be implemented where only a single CPU is present, and/or, for example, where integrated circuits, such as network controllers, are present.

BACKGROUND OF THE INVENTION

Many current systems have a main CPU(s) running application code during normal operation and an additional low power CPU which runs lower power code during low power operation when the main CPU(s) is powered off. In these systems, the main CPU(s) and low power CPU(s) must transfer system control between each other, and the transfer of control between the two CPUs can be very involved and time-consuming for the main CPU, and which can lead to a higher power consumption, especially, when the main CPU is powered on for longer periods of times than desired. For example, designers may desire to conserve maximum power by powering down the main CPU(s) as frequently as possible (for example, as soon as the main CPU(s) is idle). However, if the time needed to power down, power up, and restore the main CPU(s) state back to pre-power down state is too long, then the impact on the user may be judged to be too high due to slow application responsiveness. Accordingly, designers may be prevented from powering down the main CPU(s) as frequently as possible and higher power consumption may be the end result.

SUMMARY OF THE INVENTION

In consideration of the above issues, it would be desirable to have a method and system, which improves power saving by accelerating device suspend and resume operations, and which accelerates the control transfer steps by use of a context snooper, and wherein a main CPU can be powered down sooner (or more frequently), which can lead to lower power consumption and a faster transfer between normal and low power operation with improved responsiveness.

An apparatus is disclosed comprising: a main integrated circuit, the main integrated circuit having a context area, a context snooper, and a context cache, the context area configured to store context change information, the context snooper configured to monitor the context change information, and the context cache configured to store at least a portion of the context change information being monitored by the context snooper; and a memory, the memory configured to receive the at least a portion of the context change information from the context cache upon a suspend process signal to the main integrated circuit, to retain contents during the main integrated circuit suspend, and restore the at least a portion of the context change information to the context cache and/or the context area upon a resume process signal to the main integrated circuit.

A method is disclosed for improving power savings by accelerating suspend and resume operations for a main integrated circuits in an apparatus, the method comprising: receiving context change on the main integrated circuit; processing context changes to a context area of the main integrated circuit with the received context change; monitoring the context change with a context snooper; forward at least a portion of the context change from the context snooper to a context cache; writing the at least a portion of the context change to the context cache; and sending the at least some of the context change from the context cache to a memory upon receipt of a suspend signal on the context snooper.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
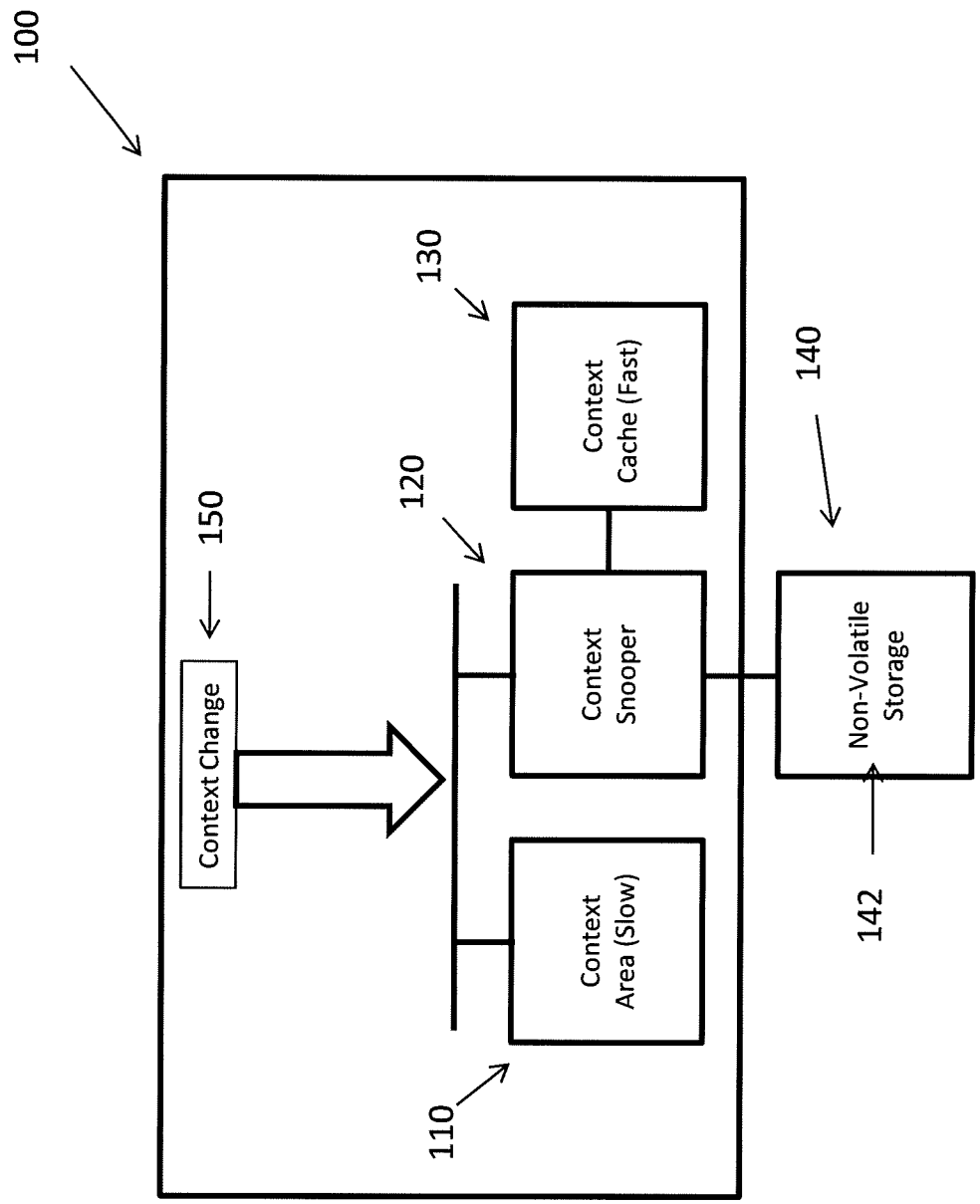
FIG. 1 is a diagram of a central processing unit (CPU) with a context snooper and a non-volatile storage unit in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a central processing unit (CPU) 100 with a context snooper 120 in accordance with an exemplary embodiment. As shown in FIG. 1, the central processing unit (CPU) 100 is the electronic circuitry within a computer or device, for example, a server 200 (FIG. 2), a client 300 (FIG. 3), or a printer (or multi-functional peripheral (MFP)) 400 (FIG. 4) that carries out the instructions of a computer program by performing the basic arithmetic, logical, control and input/output (I/O) operation specified by the instructions. In accordance with an exemplary embodiment, the methods and systems disclosed herein can be implemented in any device having a known computing system, for example, a smart phone, a smart tablet, a personal computer, a camera, a router, a medical device or apparatus, a MFP (or printer), household appliances, such as a refrigerator, an oven, a dishwasher, a microwave, a television, sensors, lights, or an Internet of Thing (IOT) device, which has a low power mode (or energy saving state), which reduces battery consumption and/or power consumption from an electrical outlet, generator, or other device capable of generating electrical power.

In accordance with an exemplary embodiment, the central processing unit (CPU) 100 can include a context area 110, a context snooper 120, and a context cache 130. In accordance with an exemplary embodiment, the context cache can speed up reads/writes from/to the context area. In addition, a memory (or storage device) 140, for example, a non-volatile storage 142 can also be in communication with the context snooper 120 as disclosed herein. In accordance with an exemplary embodiment, the memory or storage device 140 can be any memory which is unaffected by (i.e. retains contents) CPU power down. For example, the memory 140 can include off-chip memory, as well as on-chip memory, which resides outside of the CPU cores. For example, the memory 140 can be on the CPU 100, on a system on a chip (SoC), or external to the SoC. In accordance with an exemplary embodiment, the memory 140, for example, can be a volatile memory, which retains the contents of the non-volatile memory when the CPU 100 is powered off. For example, the volatile memory can remain powered (or powered on), after the CPU is powered down, to ensure that the context can be restored when the CPU is powered back up.

In accordance with an exemplary embodiment, as shown in FIG. 1, the CPU 100 has a context area 110, which is configured to receive and save context being processed by the CPU 100. For example, in accordance with an exemplary embodiment, context can be defined as any data stored within a CPU (or CPU/device) 100 affected by a powering down of the CPU (CPU/device) 100. For example, the context can include general purpose register contents, special purpose register contents, instruction cache contents, data cache contents, and other volatile data affected by CPU power down.

In accordance with an exemplary embodiment, for example, upon instruction execution or interrupt/exception, one or more updates may occur to internal CPU storage locations such as general or special purpose registers. These updates can be considered context change information and would be visible to the context snooper 120 as disclosed herein. In accordance with an exemplary embodiment, the context snooper 120 can be a microcode, silicon logic gates, or other implementation, for example, a layer of hardware-level instructions that implement machine code or internal state machine sequencing in a digital processing element.

In accordance with an exemplary embodiment, the context snooper 120 is configured to listen to changes to the context 150 being transferred via the central processing unit (CPU) 100 and the context area 110 without disturbing the transfer of the context 150 to the context area 110. Upon a triggering event, a copy of the context change 150 can be transferred by the context snooper 120 from the context cache 130 to a memory (or storage device) 140, for example, an external memory, such as a non-volatile storage 142. For example, in accordance with an exemplary embodiment, the triggering event can be a suspend signal, a power down signal (for example, sleep mode), no jobs or tasks on the CPU or CPU/device 100. For example, a CPU instruction to explicitly request context be transferred, a signal within a system on a chip (SoC) from another device or CPU requesting context be stored. In addition, a signal external to the SoC requesting context be stored (for example, a signal indicating a power problem is detected). In accordance with an exemplary embodiment, in addition to CPUs 100, the system and method disclosed herein can be applied to other hardware such as hard disk controllers, memory controllers, or network controllers.

Collectively, CPU(s) and aforementioned devices are examples of integrated circuits intended to be covered by this invention. For example, in accordance with an exemplary embodiment, main integrated circuit means an integrated circuit selected to be powered down. In accordance with an exemplary embodiment, for example, given five powered integrated circuits, one is selected for power down. The selected integrated circuit becomes the main integrated circuit and the remaining four become the low power integrated circuits. The process can be repeated on the remaining four powered integrated circuits by selecting a new integrated circuit to be powered down. In this case, the selected integrated circuit becomes the new main integrated circuit and the remaining three become the new low power integrated circuits. In this way, the terminology changes can be based on which powered integrated circuit is selected for power down. In addition, the main integrated circuit can have context snooper support. For example, systems comprised of integrated circuits with and without context snooper support can be supported. In addition, low power integrated circuits mean low power CPUs and devices such as controllers which are still powered after the main integrated circuit is powered down. In accordance with an exemplary embodiment, the low power integrated circuits and low power CPUs may have, but are not required to have, context snooper support.

In accordance with an exemplary embodiment, the context data may be slightly different for devices such as hard disk controllers, memory controllers, and network controllers compared to CPUs 100 (for example, no program counter or stack pointer expected, no distinction between general and special purpose registers), however, such devices contain registers which store context information and are subject to context change.

In accordance with an exemplary embodiment, the memory (or storage device) 140, can be a non-volatile storage 142, for example a read-only memory, flash memory, random-access memory (RAM), for example, ferroelectric RAM, a magnetic computer storage device, and/or optical disc, or a volatile memory. In accordance with an exemplary embodiment, the context snooper 120, for example, can be a microcode or silicon logic gates on the CPU 100. For example, since the existing applications on the CPU 100 use the standard CPU instruction execution path, the context snooper 120 can be configured to execute its processing using a separate path. In accordance with an exemplary embodiment, the reason for a separate path is that the existing execution path can generate context changes that needs to be monitored by the context snooper 120. Thus, the context snooper 120 should not use the standard execution path to avoid generating any context changes itself. Instead of using the standard execution path, for example, the context snooper 120 can be implemented separately in hardware, executed, for example, as microcode or silicon logic gates, such that the context snooper 120 can monitor context changes without causing any context changes.

In accordance with an exemplary embodiment, the context snooper 120 by monitoring the context changes 150 in the CPU 100 can improve responsiveness of the CPU 100 such that the CPU 100 can be designed to power down the CPU(s) 100 (for example, the main CPU(s) 100) more frequently and thus power can be conserved, for example, compared to power saving approaches, which are currently more responsive due to fewer CPU power downs but are not as power efficient.

In accordance with an exemplary embodiment, the context snooper 120 can be applied to an individual CPU and an associated storage area, and does not require any other CPUs, for example, a low power CPU to be present. In the case the case where other CPUs are present, the other CPUs (or low power CPUs) may have access to the suspended CPU's storage and may read/write to it as needed, for example, to update the stack pointer. Accordingly, the external (or other) CPU may optionally be connected to the CPU's storage area. In accordance with an exemplary embodiment, low power CPU means remaining powered CPUs after powering down, for example, an integrated circuit.

In accordance with an exemplary embodiment, to achieve the above results and improved responsiveness, the context snooper 120 can be implemented, for example, as hardware, for example, a microcode, and which is designed and implemented to accelerate the CPU suspend and resume processes. In current systems, for example, a CPU suspend process is started by entering a low power operation where the main CPU 100 is eventually powered down and the main CPU 100 resume process is started to return and enter normal operation when the main CPU 100 is finally powered back on.

For example, in current systems to achieve fast switching between normal and low power operation, the systems may have the CPU suspend process send a signal to the main CPU(s) 100 to first read their current CPU context, save the CPU context to a memory 140, for example, a non-volatile storage 142, and then power down the main CPU(s) 100 before switching to a low (or lower) power operation. In current systems, the CPU context save is provided so that when switching back to normal operation later, the CPU resume process can include powering up the main CPU, reading the CPU context from the non-volatile storage, reloading the main CPU's context, and reentering normal operation by reloading and matching the same main CPU context as in a normal operation.

In accordance with an exemplary embodiment, in the above CPU suspend process without a context snooper 120 as disclosed herein, the main CPU 100 does not begin reading the context area of the main CPU 100 until after detecting a signal and/or trigger. For example, in systems with slow CPU context area read times (for example, only sequential register access possible—one register access per clock, slower clocks, and/or for other reasons), this can lead to performance degradation and a corresponding increase in power consumption due to the additional time spent in normal operation (for example, fully powered on) for the main CPU 100.

In addition, it can be envisioned that it may be difficult for silicon vendors to improve context area read/write times directly without a context snooper 120, and which can lead to slow CPU context area read times, which can vary and may be difficult to diagnose and resolve directly. For example, silicon vendors utilizing intellectual property (IP) from third-party vendors may find that slow context area read times cannot be diagnosed, resolved, or improved without detailed modifications made to multiple IP blocks. Furthermore, for example, additional hurdles can arise where intellectual property (IP) documentation is hard-to-obtain or incomplete, leaving silicon vendors no option to make direct IP changes to needed areas. In addition, rejection by third-party IP vendors to approve expending additional engineering resources to improve performance may provide silicon vendors no clear IP improvement path. Even when using in-house IP, silicon vendors may find similar issues due to many different engineers, teams, and groups involved. Other examples can include cases where changes to existing IP blocks are judged to be too time-consuming, risky, or requiring too many engineering resources to achieve CPU context area speedup. As illustrated, for example, it is not always feasible for silicon vendors to make direct modifications to IP to improve issues such as slow CPU context area read times.

In accordance with an exemplary embodiment, a context snooper 120 is disclosed, which maintains a context cache (fast) memory and snoops and/or monitors all changes to CPU context and updates the context cache as changes are made to the CPU context. In accordance with an exemplary embodiment, the context cache 130 can be kept in sync with the main CPU context such that when the CPU suspend process signals to the main CPU 100, the main CPU 100 can quickly store the context cache 130 to the memory (or storage device) 140, for example, the non-volatile storage 142. For example, in accordance with an exemplary embodiment, whether the context change information is transferred to the context cache 130 can be judged from a result of monitoring by the context snooper 120. In addition, the context snooper 120 can be configured to judge whether the context change information is transferred to the context cache 130 and transfers the at least a portion of the context change information to the context cache 130 based on a result of the judgment.

In accordance with an exemplary embodiment, through the use of the context snooper 120, the main CPU 100 can avoid slow reads from CPU context area 110 and can instead executed fast reads from the context cache 130 and writes to the memory (or storage device) 140 (for example, non-volatile storage 142). In addition, existing IP does not need to be modified to improve context area read times. In addition, the increased performance reduces the amount of time spent in normal operation even further and can lead to improved power savings. Furthermore, the system can benefit from improved system responsiveness, especially when transitions between normal and low power operation are executed frequently.

In accordance with an exemplary embodiment, the CPU context information 150 can be filtered and/or specified by the context snooper 120 such that certain CPU context is not updated in the context cache 130. For example, by filtering and/or specifying the type of context information that is saved to the context cache 130, the power consumption of the context snooper 120 and the context cache 130 can be offset by avoiding frequent updates for CPU context data, which changes can occur, for example, at a high-rate (for example, a program counter). In addition, in accordance with an exemplary embodiment, data may be saved to the memory or storage device 140 using an alternate mechanism (for example, a hard-coded, a read from slow CPU context area, etc.).

In accordance with an exemplary embodiment, some or all of the CPU context information can be specified directly by a CPU suspend process instead of based on current CPU context information, and which can provide additional flexibility in CPU resume handling. For example, software may configure the context snooper 120 to use a stack pointer value specified explicitly by software when writing to, for example, the memory or storage device 140 instead of reading the stack pointer value directly from the context area 110.

In accordance with an exemplary embodiment, the context cache 130 can be read/written in parallel rather than sequentially with the context area 110 for improved performance. Alternatively, the context cache 130 can be read/written at a faster clock frequency than context area 110. For example, if an executed CPU instruction modifies a value of multiple registers, then the context snooper 120 may choose to write the multiple context change information generated to the context cache 130 simultaneously in one clock cycle rather than one at a time and requiring multiple clock cycles. Similarly, when the context snooper 120 s preparing to writing to the memory or storage device 140 (for example, a non-volatile memory (NV) 142), the context snooper 120 may choose to read multiple context change information from the context cache simultaneously rather than one at a time.

In accordance with another exemplary embodiment, during a resume process, the context snooper 120 can restore context in one or more ways or methods. For example, the context snooper 120 may be able to restore context by simple register write. In other scenarios, the context snooper 120 may be able to restore context by special programming sequences (for example, wait for bit to clear before moving to next step, dependency tracking, etc.). For example, CPUs 100 may require that certain registers, register fields, or register values are not written/updated/changed without first following a programming procedure. An example of such a procedure is to require one or more other registers or register fields be written first with specific values before proceeding to update a given register. Another example is to require writing a specific value to a register field to start an operation, then continually reading another register field until a specific value is returned indicating the operation completed. Only when the operation has completed can another given register be updated.

In accordance with an exemplary embodiment, the CPU context information can be transferred/accessible to other CPUs and devices, so that context information 150 can be modified if necessary to handle changes made to a system state while a CPU/s 100 is powered down. As an example, the main CPU context may contain double data rate (DDR) memory addresses pointing to DDR data. If the low power CPU moves the DDR data to a different DDR memory address, then it may be necessary for the low power CPU or other CPUs to modify the main CPU context to reflect the change.

In accordance with an exemplary embodiment, the context snooper 120 may detect that a main CPU register is updated (for example, a memory management unit-related register (MMU-related register)) and the new value can be stored in both the CPU context area 110 and the context cache 130. When the CPU suspend process starts and the main CPU 100 is signaled to save CPU context, the context snooper 120 reads from the context cache 130 and writes the CPU context to the memory or storage device 140 or non-volatile storage 142. When the main CPU 100 is powered up again, the CPU context area 110 and context cache 130 can be restored in parallel using the saved CPU context information from the memory or storage device 140 or non-volatile storage 142.

Examples of context change 150 within the CPU context area 110 can include data associated with a program counter, a stack pointer, general purpose registers, and special purpose registers (for example, MMU/cache/other CPU subsystems).

Figure 2:
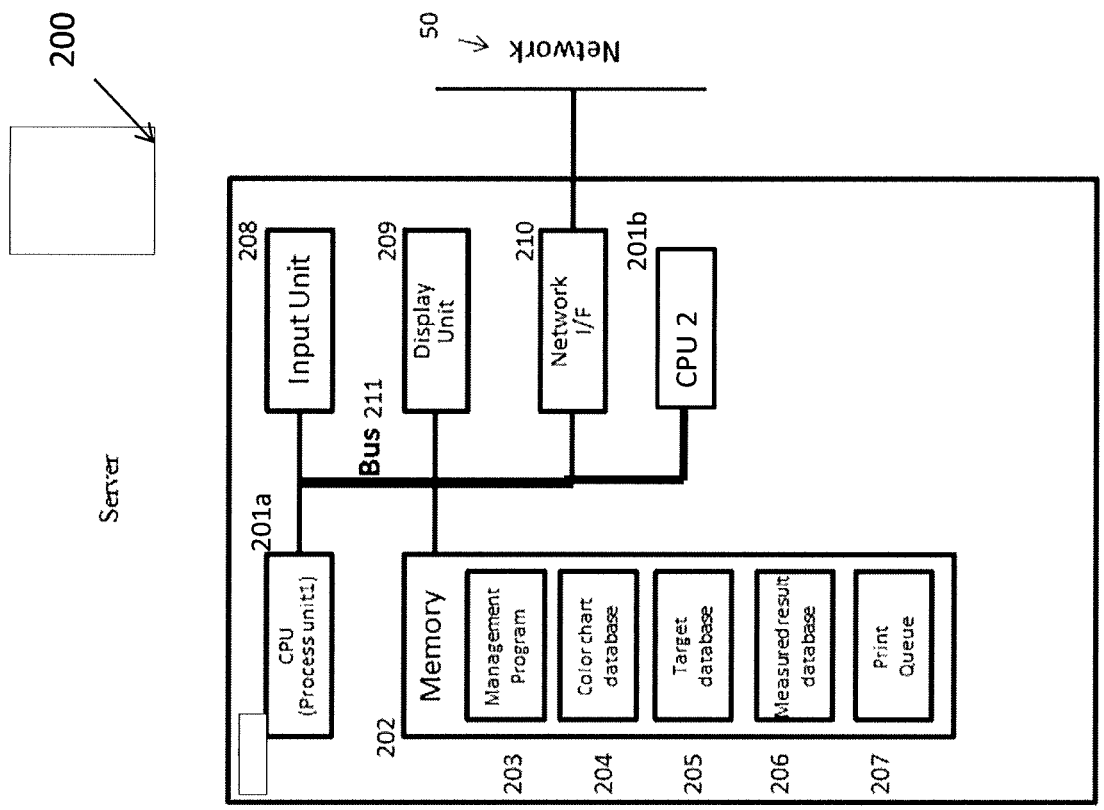
FIG. 2 is an illustration of a server in accordance with an exemplary embodiment.
Figure 3:
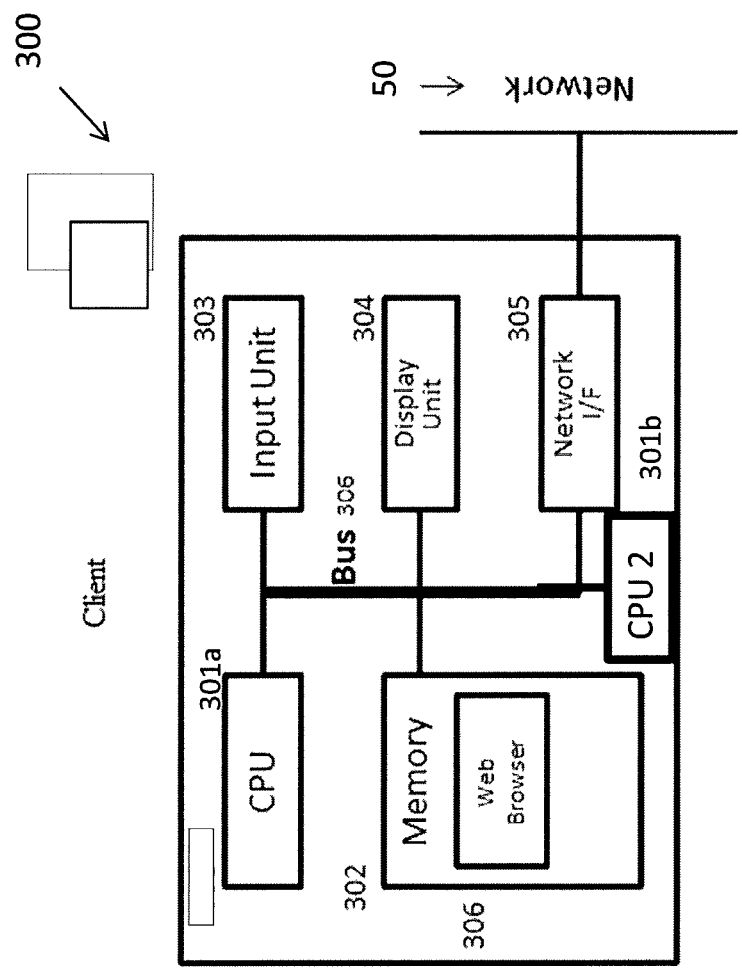
FIG. 3 is an illustration of a client or client computer in accordance with an exemplary embodiment.
Figure 4:
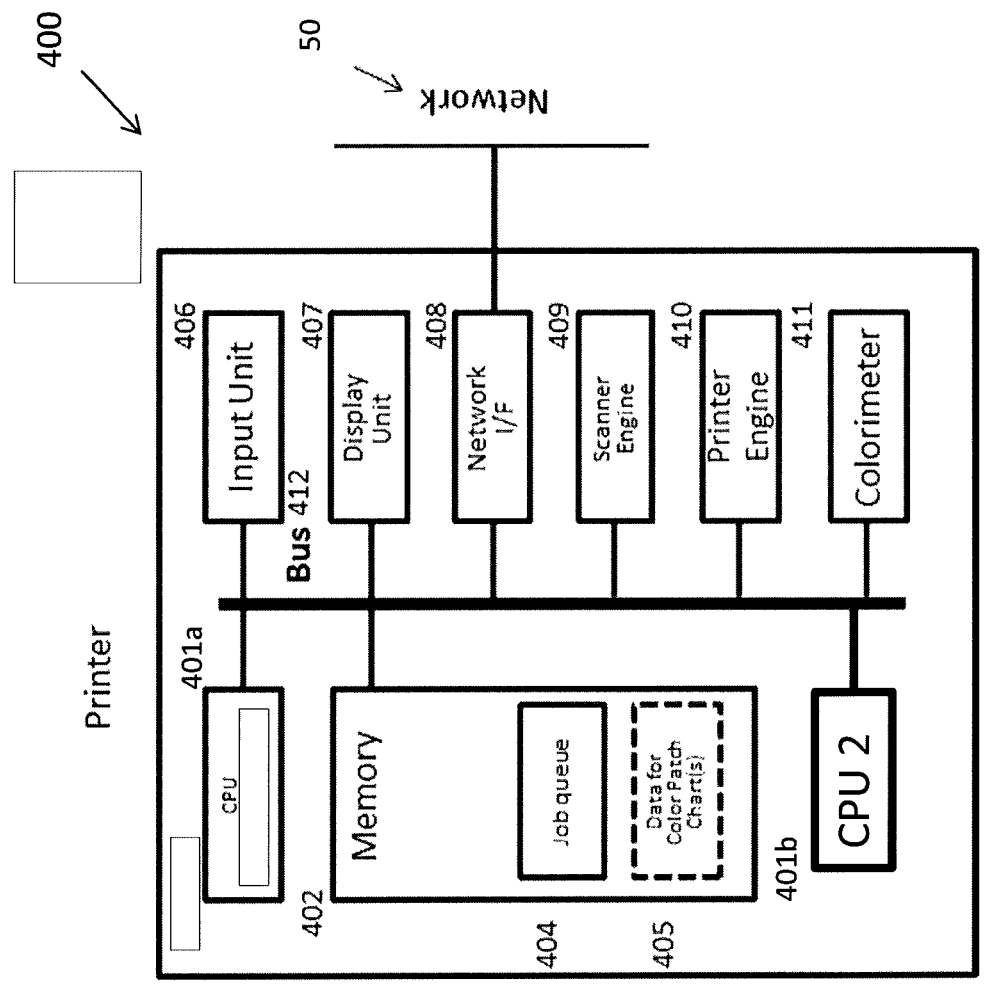
FIG. 4 is an illustration of a printer or printing device in accordance with an exemplary embodiment.

In accordance with an exemplary embodiment, any device having a main CPU and a low power CPU, for example, a server 200, a client device 300, or a multi-functional peripheral 400 as shown in FIGS. 2-4 can have a context snooper 120 as disclosed herein. As disclosed herein, with the context snooper 120, the device 200, 300, 400 can be configured such that the main CPU/s 100 can be powered down sooner in comparison to a normal low power situation. In addition, by powering the main CPU 100 down sooner, can lead to lower overall power consumption and a transfer between normal (main CPU 100 powered on) and low power modes (main CPU 100 powered off) can be executed quicker with improved responsiveness.

FIG. 2 is an illustration of a server 200 in accordance with an exemplary embodiment. As shown in FIG. 2, the server 200 can include a main (or first) processor or central processing unit (CPU) 201a, a low power (or second) processor or central processing unit (CPU) 201b, and one or more memories 202 for storing software programs and data, which can include a management program (or web portal) 203, a color chart database 204, a target database 205, a measured result data base 206, and a print queue 207. The main processor or CPU 201a carries out the instructions of a computer program, which operates and/or controls at least a portion of the functionality of the server 200. The server 200 can also include an input unit 208, a display unit or graphical user interface (GUI) 209, and a network interface (I/F) 210, which is connected to a communication network (or network) 50. A bus 211 can connect the various components 201a, 201b, 202, 208, 209, and 210 within server 200. The server 200 includes an operating system (OS), which manages the computer hardware and provides common services for efficient execution of various software programs as disclosed herein.

FIG. 3 is an illustration of a client or client computer 300 in accordance with an exemplary embodiment. As shown in FIG. 3, the exemplary host computer or client computer 300 can include a main processor or central processing unit (CPU) (or first CPU) 301a, a lower power processor or CPU 301b, and one or more memories 302 for storing software programs and data (such as files to be printed), and a printer driver. The printer driver of the client computer 30 is preferably a software application that converts data to be printed into a form specific for the printer 400. The main processor or CPU 301a carries out the instructions of a computer program, which operates and/or controls at least a portion of the functionality of the client computer 300. The client computer 300 can also include an input unit 303, a display unit or graphical user interface (GUI) 304, and a network interface (I/F) 305, which is connected to a communication network (or network) 50. A bus 306 can connect the various components 301a, 301b, 302, 303, 304, 305 within the client computer 300.

In accordance with an exemplary embodiment, the one or more client computers 300 each include a display unit or graphical user interface (GUI) 304, which can access the web browser 306 in the memory 302 of the client computer 300. The client computer 300 includes an operating system (OS), which manages the computer hardware and provides common services for efficient execution of various software programs. The software programs can include, for example, application software and printer driver software. For example, the printer driver software controls a multifunction printer or printer 400, for example connected with the client computer 300 in which the printer driver software is installed via the communication network 50. In certain embodiments, the printer driver software can produce a print job and/or document based on an image and/or document data. In addition, the printer driver software can control transmission of the print job from the client computer 300 to the at least one server 200 and/or the printer or printing device 400.

FIG. 4 is an illustration of a printer or printing device 400, which can be referred to as an image forming apparatus in accordance with an exemplary embodiment. As shown in FIG. 4, the printer 400 can include a network interface (I/F) 408, which is connected to the communication network (or network) 50, a main processor or central processing unit (CPU) (first CPU) 401a, a low power CPU (or second CPU) 401b, and one or more memories 402 for storing software programs and data (such as files to be printed). For example, the software programs can include a printer controller and a tray table. The main processor or CPU 401a carries out the instructions of a computer program, which operates and/or controls at least a portion of the functionality of the printer 400. In accordance with an exemplary embodiment, the one or more memories 402 can include a job queue 404 and data for color patch chart(s) 405. The printer 40 can also include an input unit 406, a display unit or graphical user interface (GUI) 407, a network interface (I/F) 408, a scanner engine (or scanner) 409, a printer engine 410, and a colorimeter 411. In accordance with an exemplary embodiment, the printer 400 can be equipped with inline colorimeter (ICCU) (or spectrophotometer) 411, which measures printed color patches in order to generate color profiles.

In accordance with an exemplary embodiment, for example, the colorimeter (or spectrophotometer) 411 can be one or more color sensors or colorimeters, such as an RGB scanner, a spectral scanner with a photo detector or other such sensing device known in the art, which can be embedded in the printed paper path, and an optional finishing apparatus or device (not shown). A bus 412 can connect the various components 401a, 401b, 402, 404, 405, 406, 407, 408, 409, 410, 411 within the printer 400. The printer 400 also includes an operating system (OS), which manages the computer hardware and provides common services for efficient execution of various software programs. In accordance with an exemplary embodiment, it can be within the scope of the disclosure for the printer 400 to be a copier.

For example, in accordance with an exemplary embodiment, an image processing section within the printer 400 can carry out various image processing under the control of a print controller or main CPU 401a, and sends the processed print image data to the print engine 410. The image processing section can also include a scanner section (scanner 409) for optically reading a document, such as an image recognition system. The scanner section receives the image from the scanner 409 and converts the image into a digital image. The print engine 410 forms an image on a print media (or recording sheet) based on the image data sent from the image processing section. The central processing unit (CPU) (or processor) 401a and the memory 402 can include a program for RIP processing (Raster Image Processing), which is a process for converting print data included in a print job into Raster Image data to be used in the printer or print engine 410. The main CPU 401a can include a printer controller configured to process the data and job information received from the one or more client computers 300, for example, received via the network connection unit and/or input/output section (I/O section) 408.

The main and the low power CPUs 401a, 401b can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the network I/F 408 performs data transfer with the at least one server 200 and the at least one client computer 300. The printer controller can be programmed to process data and control various other components of the multi-function peripheral to carry out the various methods described herein. In accordance with an exemplary embodiment, the operation of printer section commences when the printer section receives a page description from the at least one server 200 or the one or more client computers 300 via the network I/F 408 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 40 consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, a communication network or network 50 connecting the devices can include a public telecommunication line and/or a network (for example, LAN or WAN). Examples of the communication network 50 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Figure 5:
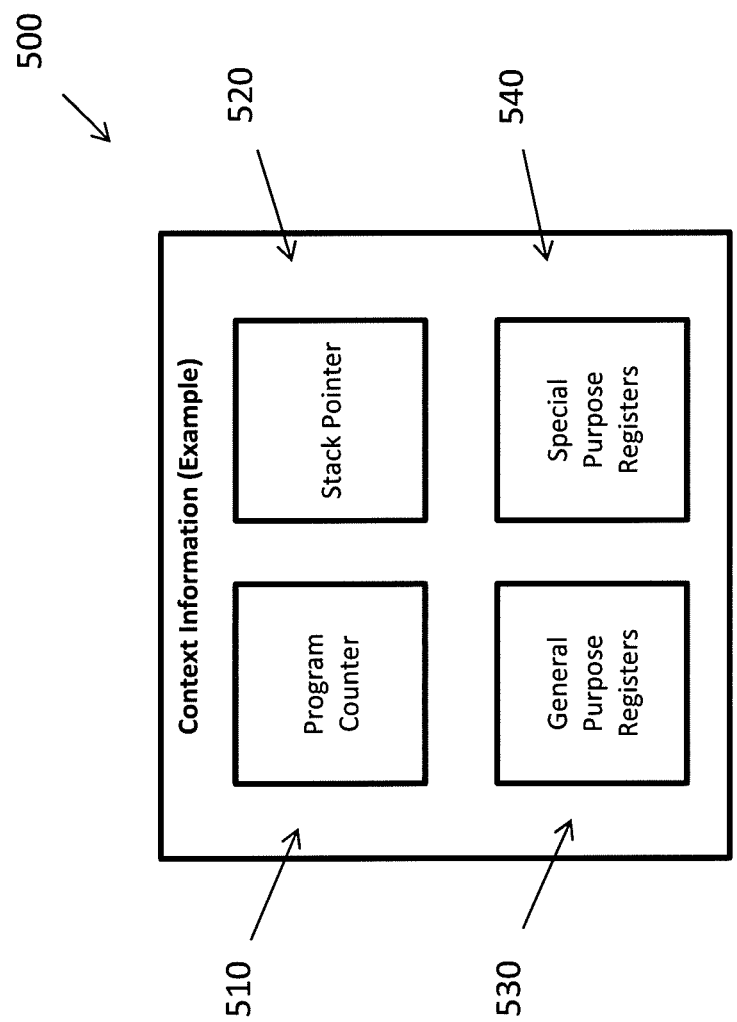
FIG. 5 is an illustration of examples of context information in accordance with an exemplary embodiment.

FIG. 5 is an illustration of examples of context information 500, which can be accessed by the CPU 100 from the memory 202, 302, 402 of the apparatus in accordance with an exemplary embodiment. As shown in FIG. 5, examples of context information 500 can include addresses of the next instruction saved, for example, in a program counter 510, information about active subroutines of a computer program, for example, as saved in a stack pointer 520, data stored and/or transferred, for example, to a general-purpose register 530, and/or data stored and/or transferred, for example, to a special-purpose register 540.

In accordance with an exemplary embodiment, for example, the context information 500 can include addresses saved in a program counter 510. A program counter 510 can be a register, which contains the address in read-only memory (ROM) or random-access memory (RAM) of the next instruction to be executed by the CPU 100. For example, in most processors, the program counter 510 can be incremented after fetching an instruction, and holds the memory address of ("points to") the next instruction that would be executed. In a processor or CPU 100 where the incrementation precedes the fetch, the program counter 510 points to the current instruction be executed.

A call stack is a stack data structure that stores information about the active subroutines of a computer program. Each stack may also include a stack pointer 520 to a data structure on a top of the stack as is known to those skilled in the art. For example, when context is retrieved from the stack for use by a process, an address of the context of the top data structure referenced by the stack pointer 520 may be communicated to the processor or CPU 100.

A processor register can be an accessible location available to the CPU 100. For example, registers can consist of a small amount of fast storage, although, some registers have specific hardware functions, and may be read-only or write only. Registers are typically addresses by mechanisms other than main memory, but in some cases may be assigned a memory address. Processor registers are normally at the top of the memory hierarchy, and can provide the fastest way to access data. Processor registers, for example, can include user-accessible registers, internal registers, and architectural registers. User-accessible registers can be read or written by machine instructions, and can include general-purpose registers and special purpose registers. General-purpose registers 530, for example, can store both data and addresses, for example, they can combine data/address registers. Special-purpose registers 540 can hold additional settings for other CPU components, such as the MMU and cache controller. For example, the base DDR address of the MMU page tables.

Figure 6:
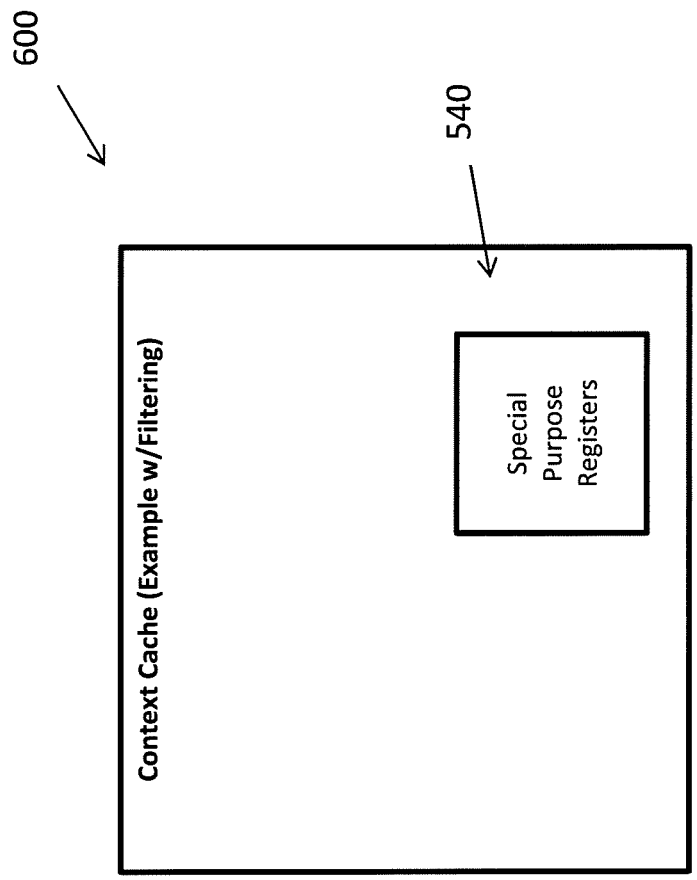
FIG. 6 is an illustration of an example of the filtering of the context information by the context snooper in accordance with an exemplary embodiment.

FIG. 6 is an illustration of an example of context information 600, in which only the special purposes registers 540 are updated by the context snooper 120 in accordance with an exemplary embodiment. For example, in accordance with an exemplary embodiment, rather than storing the context information from the program counter 510, the stack pointer 520, and the general purpose register 530, the context snooper 120 can be configured to only monitor context information 150, which is stored in the special-purpose registers 540. For example, the context snooper 120 can filter the context information that is sent to the context cache 130.

Figure 7:
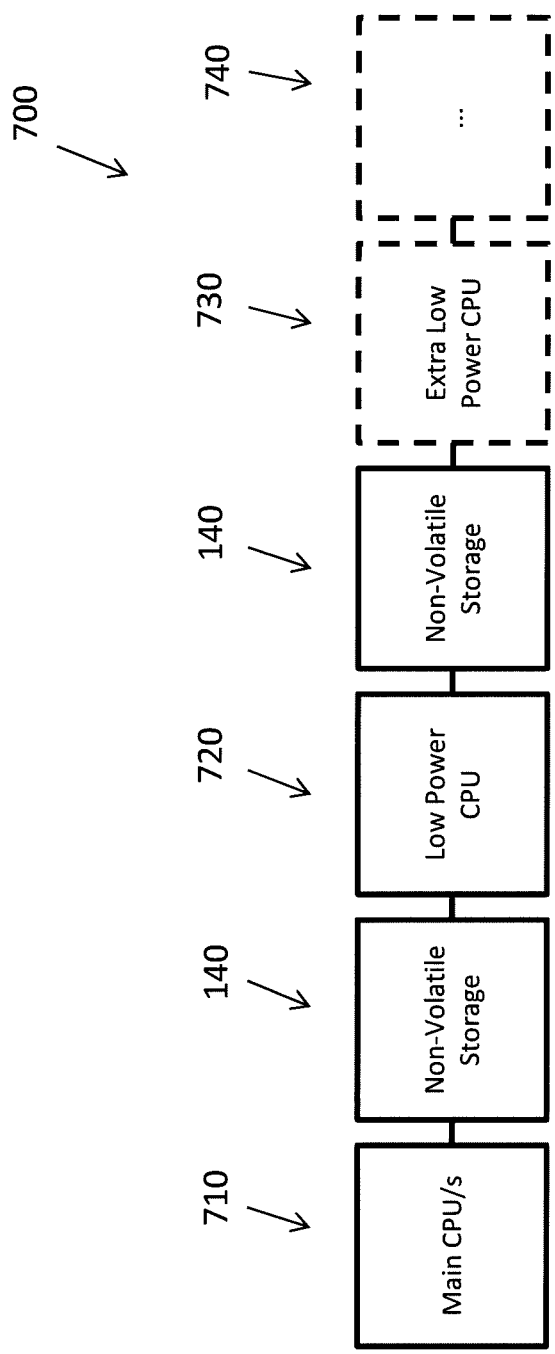
FIG. 7 is an illustration of a system showing that non-volatile storage is accessible to and may be modified by other CPUs in accordance with an exemplary embodiment.

FIG. 7 is an illustration of a system 700 showing that a non-volatile storage 720 can be accessible to and may be modified by other CPUs 710, 720, 730, in accordance with an exemplary embodiment. As shown in FIG. 7, in accordance with an exemplary embodiment, the memory or storage device 140 (i.e., non-volatile memory 142) can be configured to receive data from one or more main CPU(s) 710, one or more low power CPU(s) 720, and one or more extra low power CPU(s) 730. For example, each of the one or more main CPU(s) 710, the one or more low power CPU(s) 720, and the one or more extra low power CPU(s) 730 can have a lower power requirement than an adjacent CPU 720, 730, 740, 750. In accordance with an exemplary embodiment, the memory (or storage device) 140 can be a single memory or storage device 140, which is connected to each of the CPU(s) 710, 720, 730, for example, in a star topology. Alternatively, each of the CPU(s) 710, 720, 730 can include a separate memory (or storage device) 140 as shown in FIG. 7.

Figure 8:
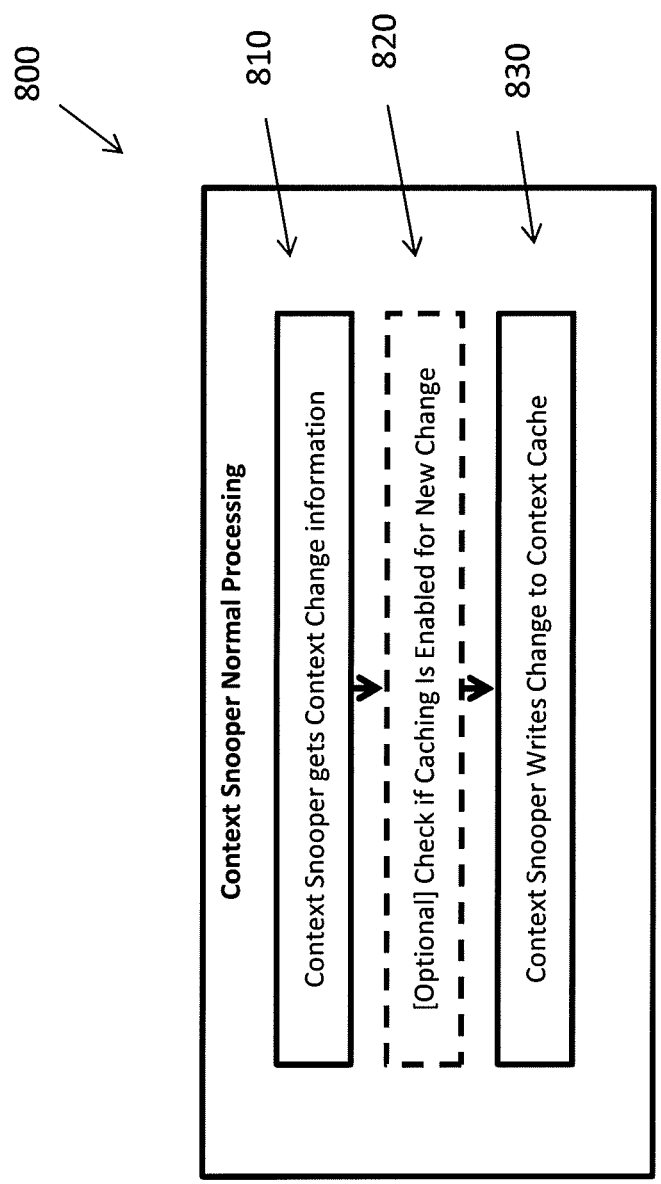
FIG. 8 is an illustration of a sequence diagram showing an operation performed by the context snooper in accordance with an exemplary embodiment.

FIG. 8 is an illustration of a sequence diagram 800 showing a normal context snooper operation in accordance with an exemplary embodiment. As shown in FIG. 8, in step 810, the context snooper 120 obtains context change information 150. In step 820, which can be optional, the context snooper 120 checks if caching is enabled for the new context change information 150. For example, as described above, the new context change information 150 may be filtered or specified by the context snooper 120 such that the new context change information 150 is not written to the context cache 130. In step 830, the context snooper 120 writes the new context change information 150 to the context cache 130.

Figure 9:
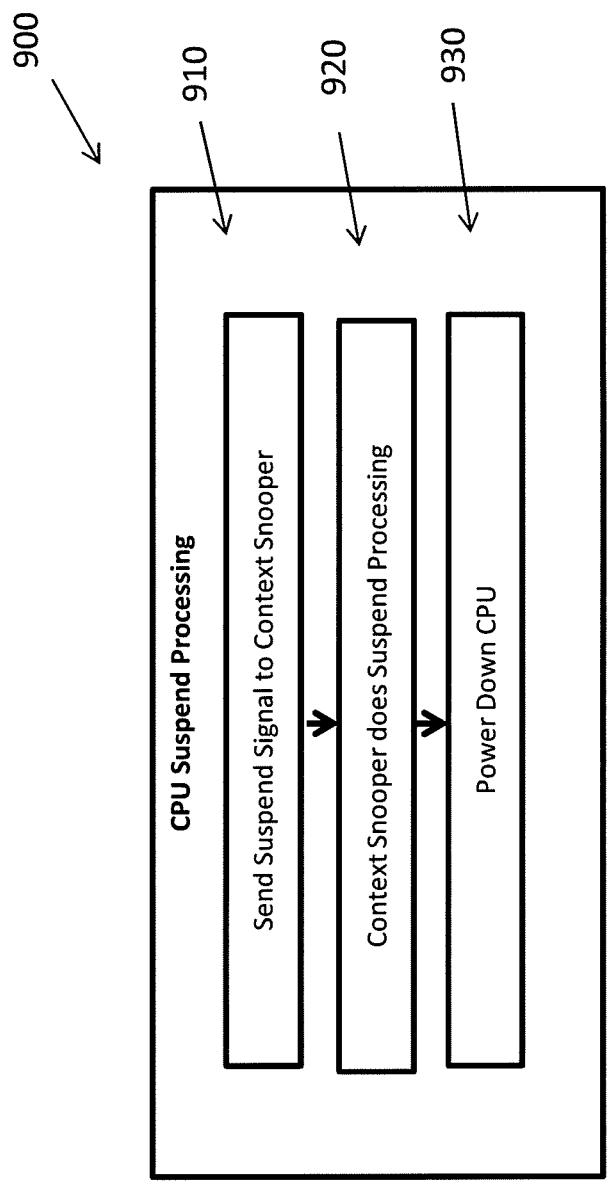
FIG. 9 is an illustration of a sequence diagram showing a central processing unit (CPU) power down process in accordance with an exemplary embodiment.
Figure 10:
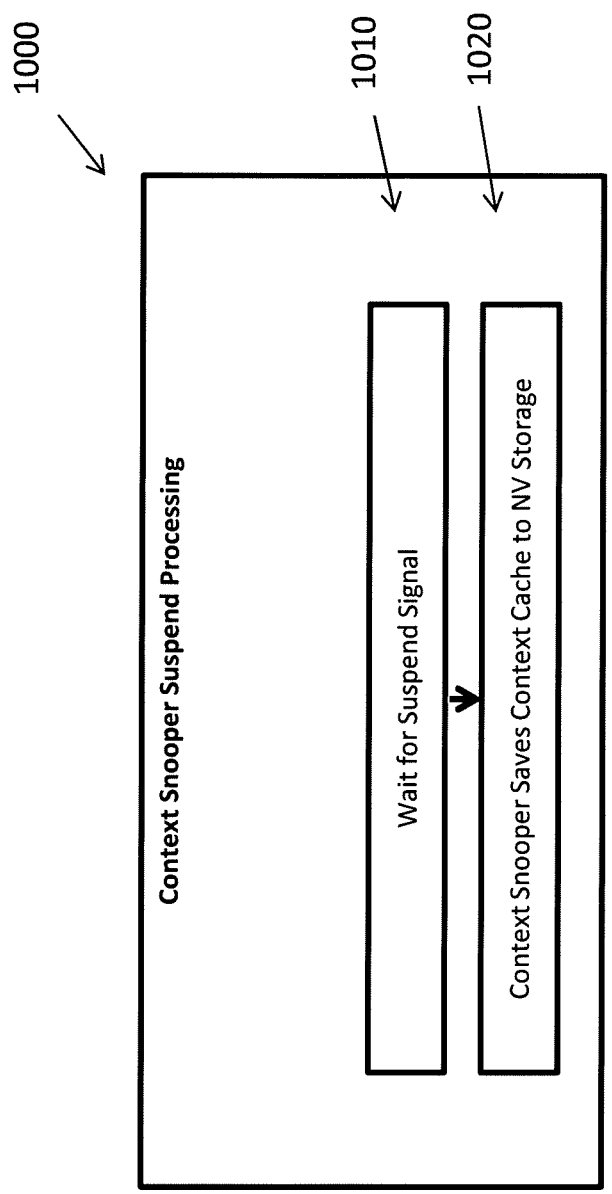
FIG. 10 is an illustration of a sequence diagram showing context snooper steps for receiving a suspend signal in accordance with an exemplary embodiment.

FIG. 9 is an illustration of a sequence diagram 900 showing a central processing unit (CPU) 100 power down process in accordance with an exemplary embodiment. As shown in FIG. 9, in step 910, a suspend signal is send to the context snooper 120. In step 920, the context snooper 120 executes the suspend processing as shown in FIG. 10. In step 930, the main CPU 100 is powered down.

FIG. 10 is an illustration of a sequence diagram 1000 showing a context snooper 120 steps for receiving a suspend signal in accordance with an exemplary embodiment. As shown in FIG. 10, in step 1010, the context snooper 120 waits for the suspend signal. Upon receipt of the suspend signal, in step 1020, the context snooper 120 saves the context information in the context cache 130 to the memory or storage device 140 (i.e., non-volatile memory 142).

Figure 11:
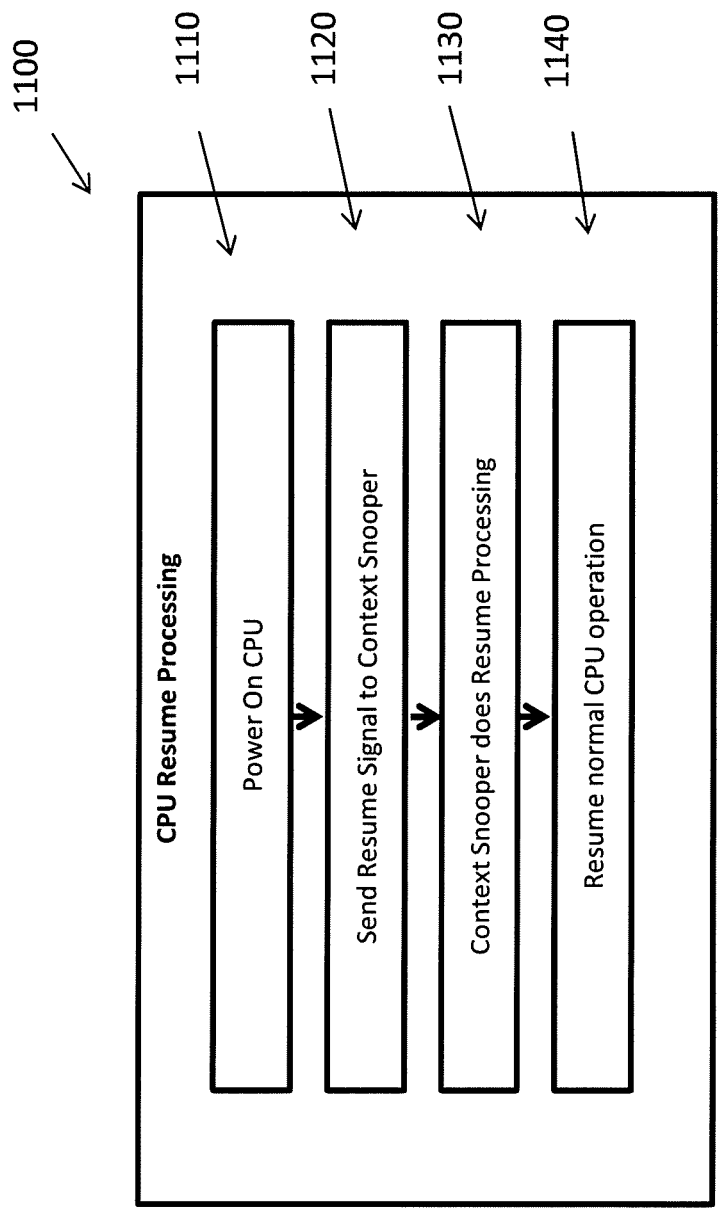
FIG. 11 is an illustration of a sequence diagram showing timing for a context snooper resume process in accordance with an exemplary embodiment.

FIG. 11 is an illustration of a sequence diagram 1100 showing timing for a context snooper 120 resume process in accordance with an exemplary embodiment. As shown in FIG. 11, in step 1110, the main CPU 100 is powered on, for example, electrical power is applied to the CPU 100. In step 1120, a resume signal is sent to the context snooper 120 upon receipt of the powered on signal. In step 1130, the context snooper 1130 executes the resume processing as set forth in FIG. 12. In step 1140, the CPU resumes to a normal CPU operation.

Figure 12:
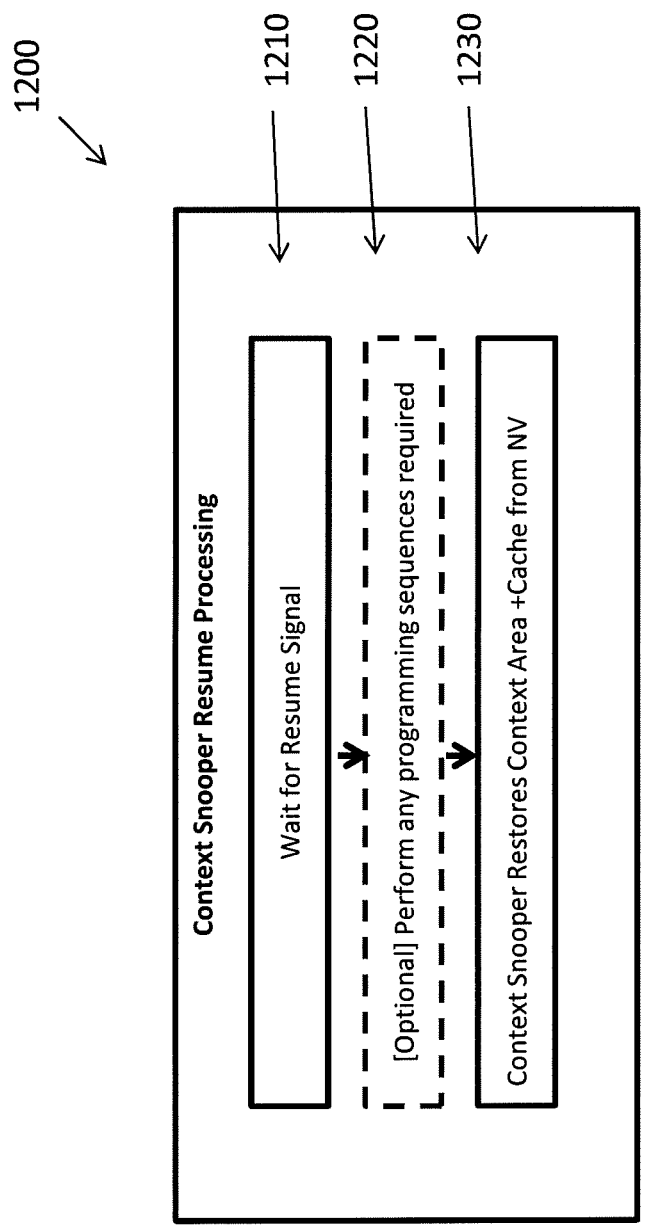
FIG. 12 is an illustration of a sequence diagram showing a context snooper and steps executed during a resumption process in accordance with an exemplary embodiment.

FIG. 12 is an illustration of a sequence diagram 1200 showing a context snooper 1200 and steps executed during a resumption process in accordance with an exemplary embodiment. As shown in FIG. 12, in step 1210, the context snooper 120 waits for the resume signal. In step 1220, which can be optional, the context snooper 120 can execute or perform any required programming sequences as described above. In step 1230, the context snooper 120 restores the context information in the context area 110 and the context cache 150 from the memory or storage device 140 (i.e., non-volatile memory 142).

Figure 13:
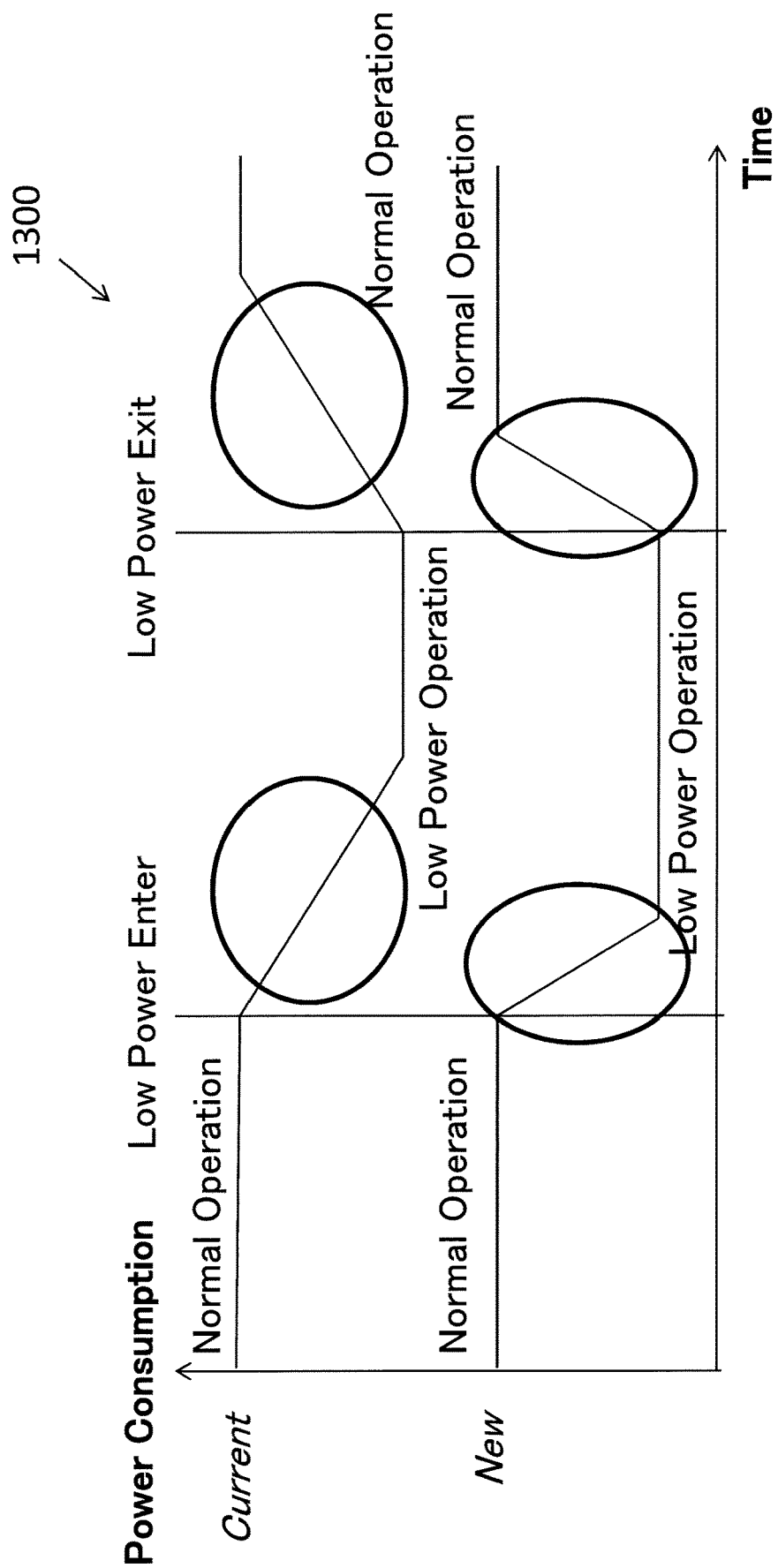
FIG. 13 is an illustration of a diagram showing how a shorter enter and exit times can conserve additional power during a lower power operation and a normal operation in accordance with an exemplary embodiment.

FIG. 13 is an illustration of a diagram 1300 showing how a shorter enter and exit times can conserve additional power during a lower power operation and a normal operation in accordance with an exemplary embodiment. As shown in FIG. 13, the context snooper 120 can shorten the time period for entry into a low power operation and can also shorten the time to resume to the normal CPU operation from known systems.

Figure 14:
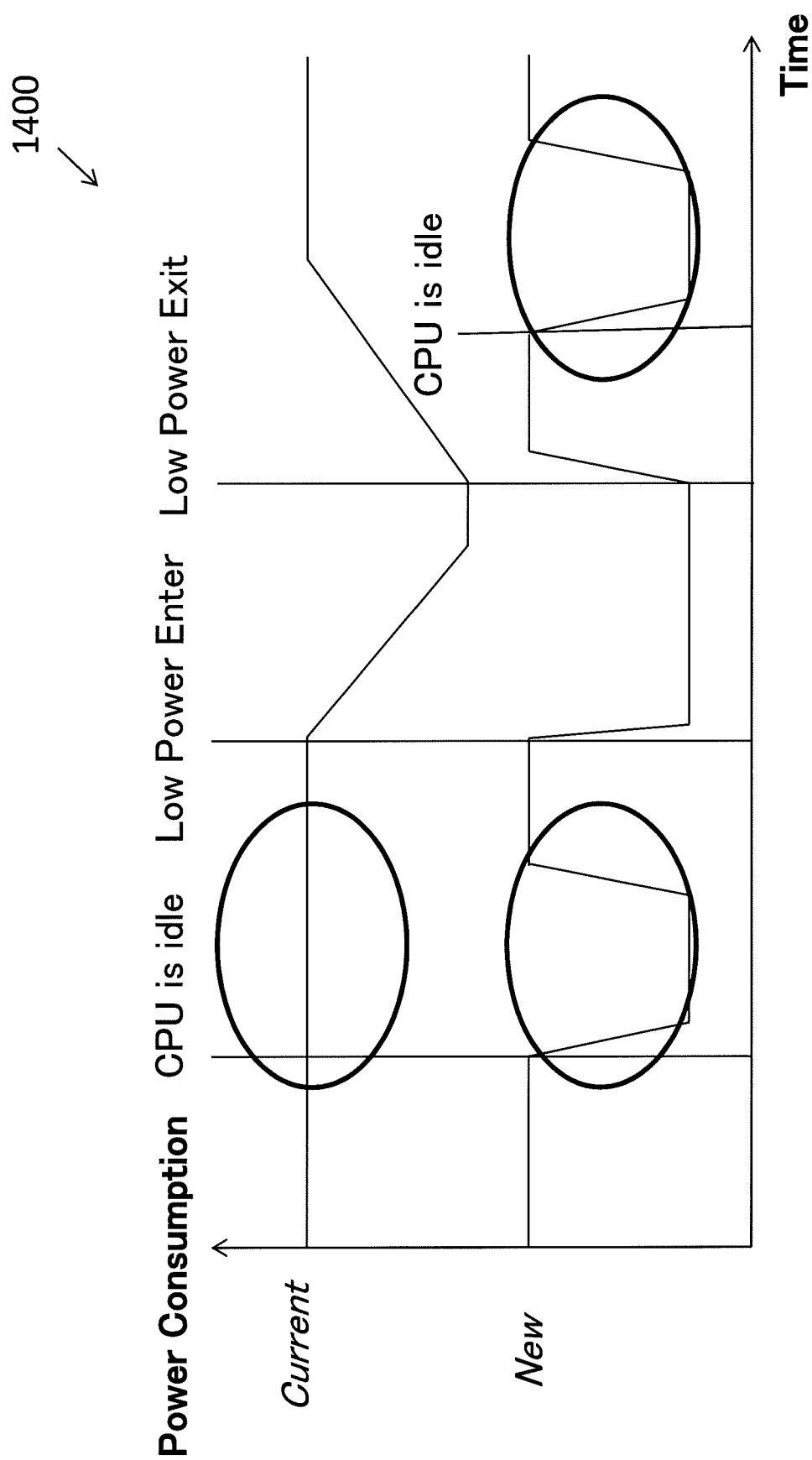
FIG. 14 is an illustration of a diagram showing how a shorter enter and exit time allows product designers to achieve a lower power consumption in accordance with an exemplary embodiment.

FIG. 14 is an illustration of a diagram 1400 showing how a shorter enter and exit time allows product designers to achieve a lower power consumption in accordance with an exemplary embodiment. As shown in FIG. 14, with the ability to enter into a low power operation and resume to the normal CPU operation with increased speed, the context snooper 120 can allow devices to enter into a low power operation more frequently, which can save power over a normal operation in which the CPU is fully powered in an idle mode, for example, when the main CPU is not being used by a program and/or has completed all tasks.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus comprising:
a main integrated circuit, the main integrated circuit having a context area, a context snooper, and a context cache, the context area configured to store context change information, the context snooper configured to monitor the context change information, wherein the context snooper judges whether the context change information is transferred to the context cache based on filtering and/or specifying the type of context information that is saved to the context cache, and wherein the context snooper judges whether the context change information is transferred from the context cache to a memory based on a detection of a triggering event, the triggering event being a suspend signal, a power down signal, or no jobs or tasks on the main integrated circuit, and wherein the context snooper transfers at least a portion of the context change information from the context cache to the memory only when the triggering event is detected, and the context cache configured to store the at least the portion of the context change information being monitored by the context snooper; and
the memory configured to receive the at least the portion of the context change information from the context cache upon a suspend process signal to the main integrated circuit, to retain contents during the main integrated circuit suspend, and restore the at least the portion of the context change information to the context cache and/or the context area upon a resume process signal to the main integrated circuit.

2. The apparatus of claim 1, wherein the main integrated circuit is a central processing unit (CPU).

3. The apparatus of claim 1, further comprising:
one or more low power integrated circuits, the one or more low power integrated circuits configured to operate the apparatus upon a suspension of the main integrated circuit.

4. The apparatus of claim 1, wherein the apparatus is a server, a computer, a printer, or a multi-functional peripheral.

5. The apparatus of claim 1, wherein the context area, the context snooper, and the context cache are arranged on the main integrated circuit.

6. The apparatus of claim 1, wherein the context snooper is a microcode or silicon logic gates.

7. The apparatus of claim 1, wherein the memory is a volatile memory, and wherein the volatile memory remains powered after the main integrated circuit is powered down.

8. The apparatus of claim 1, wherein the context information is data configured to be stored in a program counter, a stack pointer, a general-purpose register, a special-purpose register, instruction caches, data caches, or other volatile data affected by the main integrated circuit power down.

9. The apparatus of claim 1, further comprising:
a plurality of low power integrated circuits, and wherein the at least the portion of the context change information is transferable and/or accessible by each of the plurality of low power integrated circuits.

10. The apparatus of claim 1, wherein reads/writes to the context cache and the context area are in parallel.

11. A method for improving power savings by accelerating suspend and resume operations for a main integrated circuit in an apparatus, the method comprising:
receiving context change on the main integrated circuit;
processing context changes to a context area of the main integrated circuit with the received context change;
monitoring the context change with a context snooper, wherein the context snooper judges whether the context change information is transferred to the context cache based on filtering and/or specifying the type of context information that is saved to the context cache, and wherein the context snooper judges whether the context change information is transferred from the context cache to a memory based on a detection of a triggering event, the triggering event being a suspend signal, a power down signal, or no jobs or tasks on the main integrated circuit, and wherein the context snooper transfers at least a portion of the context change information from the context cache to the memory only when the triggering event is detected;
transferring the at least the portion of the context change from the context snooper to a context cache;
writing the at least the portion of the context change to the context cache; and
sending the at least some of the context change from the context cache to the memory upon receipt of a suspend signal on the context snooper.

12. The method of claim 11, wherein the context information is data configured to be stored in a program counter, a stack pointer, a general-purpose register, a special-purpose register, instruction caches, data caches, or other volatile data affected by the main integrated circuit power down.

13. The method of claim 11, further comprising:
a plurality of low power integrated circuits, and wherein the at least the portion of the context change information is transferable and/or accessible by each of the plurality of low power integrated circuits.

14. The method of claim 11, further comprising:
enabling the context cache to receive only certain types of the context change.

15. The method of claim 11, further comprising:
performing reads/writes to the context cache and the context area in parallel from the memory.

16. The method of claim 11, further comprising:
sending a resume signal to the context snooper upon resuming a power on state of the main integrated circuit; and
restoring the context area and the context cache with the at least the portion of the context change from the memory.

17. The method of claim 11, further comprising:
performing programming sequences before restoring the context area and the context cache with the at least the portion of the context change from the memory.

18. The method of claim 16, further comprising:
resuming an operation of the main integrated circuit upon receipt of the at least the portion of the context change from the memory in the context area and the context cache.

19. The method of claim 11, wherein the memory is a volatile memory, and wherein the volatile memory remains powered after the main integrated circuit is powered down.

20. The method of claim 16, wherein the restoring of the context area and the context cache with the at least the portion of the context change from the memory comprises:
writing to one or more registers or register fields first with specific values before proceeding to update a given register; or
writing a specific value to a register field to start an operation and then continually reading another register field until a specific value is returned indicating an operation has been completed.

\* \* \* \* \*